United States Patent [19]
Sato

[11] 3,936,143
[45] Feb. 3, 1976

[54] OPTICAL FIBRE END CONNECTOR
[75] Inventor: Setsuo Sato, Yokohama, Japan
[73] Assignee: Aoi Sansho Kabushiki Kaisha, Tokyo, Japan
[22] Filed: Aug. 13, 1974
[21] Appl. No.: 497,107

[30] Foreign Application Priority Data
Apr. 15, 1974   Japan.............................. 49-042564

[52] U.S. Cl. ........ 350/96 C; 350/96 R; 350/96 WG
[51] Int. Cl.² .............................................. G02B 5/14
[58] Field of Search .......... 350/96 C, 96 R, 96 WG, 350/247, 252

[56] References Cited
UNITED STATES PATENTS

| | | | |
|---|---|---|---|
| 3,396,343 | 8/1968 | Wesselink...................... | 350/252 X |
| 3,455,625 | 7/1969 | Brumley et al.................. | 350/96 C |
| 3,713,725 | 1/1973 | Uesugi............................ | 350/247 |
| 3,800,388 | 4/1974 | Borner et al.................... | 350/96 C X |

OTHER PUBLICATIONS
Borner et al., "Losbare Steckverbindung fur Ein–Mode–Glasfaserlichtwellenleiter" Areh. Elektron. Ubertragungstech., Vol. 26, No. 6, June 1972, pp. 288–289.

Primary Examiner—John K. Corbin

[57] ABSTRACT

A connector having two connector portions which are adjustably connected together to be in aligned relationship and with each portion receiving the respective ends of optical fibre lines to be connected together in abutting and aligned relationship. At least one connector portion has an inner collar in which the end of the fibre is disposed to lie in eccentric relationship to the longitudinal axis of the collar. This inner collar is rotatably disposed in a hole in an outer collar with the hole being eccentrically disposed with respect to the longitudinal axis of its outer collar. By angular adjustment of the inner and outer collars with respect to each other the respective ends of the optical fibre lines can be positioned with respect to each. At least one inner collar can be of transparent material so that optical leakage occurring at the connector can be easily detected.

4 Claims, 6 Drawing Figures

OPTICAL FIBRE END CONNECTOR

BACKGROUND OF THE INVENTION

The invention relates to a connector for accurately connecting the ends of optical fibre lines used to transmit light energy from a light source such as a semiconductor laser to a light receiver such as a photodiode.

As is known in the art the transmission of light energy by means of optical fibre lines has certain advantages. Thus the optical fibre line provides:

1. A remarkably high capacity of information transmission per unit section area.
2. A low damping factor.
3. Ease of installation and high flexibility in use.
4. Non inductive interruption because of the use of an electric insulating material.

Because of these advantages attempts are being made to use the fibre optics transmission line in fields such as long-distance large capacity communications, data transfer in computer systems, circuits used in aircraft, CATV circuits, and others.

However heretofor an effective transmission line to be used for optical communication has not been realized, because of the fact that these have not yet been developed a satisfactory connector capable of connecting the adjacent ends of optical fibres in alignment.

In the union between the adjacent ends of the optical fibres, it is required that a core and a clad of the end of one side be precisely and completely united with the corresponding parts of other side. In case this union slips and becomes imperfect, communication will become impossible as a result of light leakage. Consequently a precision degree in perfect union of the connection is required in the use of a single mode fibre and multi mode fibre where the boundary between core and clad is clear and in the use of a focusing type fibre such as selfoc which is so constructed as to decrease little by little the refractive index towards the clad from the core in the selfoc. It is also desirable that a connector for uniting the cores of two fibre ends, which are fine or hair-like threads, should be developed.

Therefore it is a first object of the present invention, considering above mentioned needs, to provide a low cost and easily operated connector which will unite precisely and perfectly adjacent ends of optical fibre ends and which will retain them in a satisfactory united condition.

Further, the length of the optical communication fibres now on the market have been generally standardized at one kilometer long. This presents somewhat of a problem when it is necessary to confirm the degree of unions between adjacent ends of the fibres. Thus in attempting to confirm whether there is any optical leakage at the union it is necessary to detect this from the end of the fibre opposite the union or from 1 kilometer away. Accordingly, this operation becomes a very large scale project. Therefore, it is desirable that any optical leakage should be easily and rapidly detected at the connector and should be corrected there. Consequently the complete union should be confirmed by detecting the point where the optical leakage becomes zero. However, as is known, the circumference of the optical fibre is covered over with cladding glass which is of a low refractive index, so it is not considered appropriate to detect an abnormal damping resulting from said optical leakage if it is necessary to peel off the cladding glass.

The second object of the present invention, considering the above mentioned needs, is to provide an optical fibre end connector which not only permits a complete connecting operation to be quickly made but also providing at the connector itself means whereby optical leakage can be detected.

Furthermore, as the optical fibres are of very small diameter, the connector holding the end of the optical fibres must also be manufactured in super small sizes. It follows that if slight errors in manufacturing the connectors occur there may be problems involved in installing them. Therefore, it is desirable that such connectors be capable of being finely adjusted in a direction both toward the longitudinal center line of the connector and the circumference thereof to compensate for any deficiencies in manufacture.

The third object of the present invention, considering the above mentioned needs, is to provide an optical fibre end connector capable of being adjusted through a wide range and particularly adjustments toward and through the longitudinal center line of the connector.

The fourth object of the present invention is to provide an optical fibre end connector which enables one to magnify and actualize the range wherein adjustment is possible in uniting ends of the fibre, towards the circumference.

SUMMARY OF THE INVENTION

In order to accomplish the first object set forth above, a connector is provided which has double eccentric inner and outer collars which are rotatable independently of each other. The outer eccentric collar is rotatably positioned within a fixing means for rough positioning. A fibre end is fixed within the inner eccentric collar.

In order to accomplish the said second object of the invention the eccentric inner collar is made with transparent material so that light leakage can be detected at the collar.

Further, in order to accomplish the third object of this invention the collars are made so that a distance between two centers of outer and inner circle of said inner eccentric collar is equal to a distance between two centers of outer and inner circles of the said eccentric outer collar.

And finally, in order to accomplish the fourth object of the invention means are provided at the collar whereby a slight adjustment at both fibre ends to be united can be made.

DESCRIPTION OF THE PREFERRED EMBODIMENTS

Figure 1:
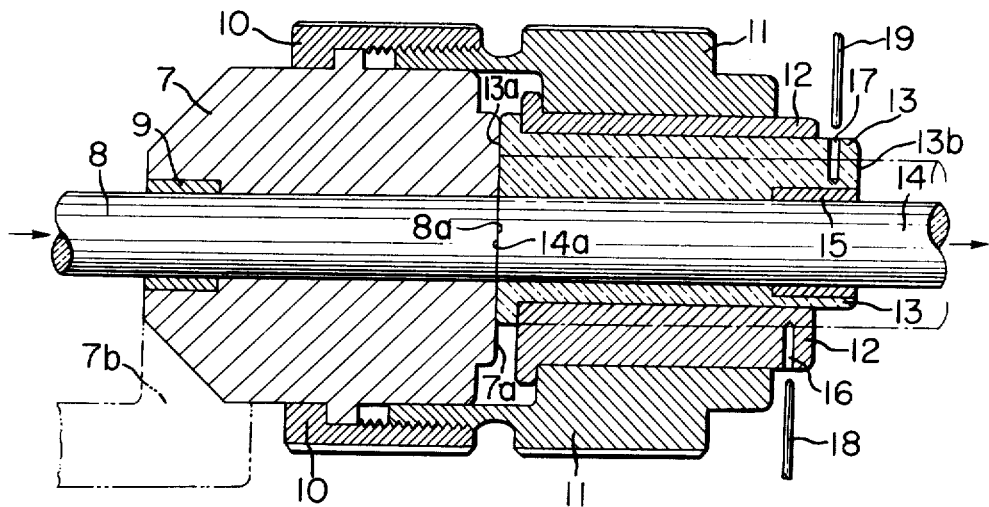
FIG. 1 is an enlarged sectional view of the connector and showing two fibre ends connected together.
Figure 2:
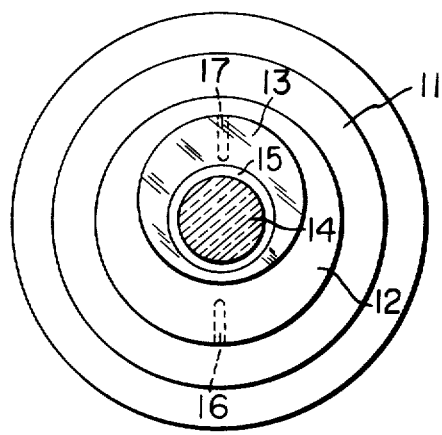
FIG. 2 is a side view of the connector as seen from the right hand side of FIG. 1.

In FIG. 1 a union swivel end 7 is provided at the end of a fibre to be connected. An optical fibre end 8 is inserted into a hole made along the center line of this union swivel end and extends to a point where the end surface 8a of the optical fibre is in the same plane with an end surface 7a of the union swivel end 7. At this position, the fibre end 8 and the union swivel end 7 are fixed by placing adhesive material 9 into an enlarged hole made at a rear end of the union swivel end 7. The swivel end 7 is fixed within a supporter unit such as a bracket 7b.

A union nut 10 is fitted along the circumference of the union swivel end 7 and a rough positioning of the connecting side is attained by screwing a union screw 11 along a female screw of the union nut 10.

An outer collar 12 is inserted rotatably into a hole provided in the union screw 11 and the center of a hole provided in this outer collar 12 is eccentric as compared with a center of a circumference of the outer collar 12.

An inner collar 13 is inserted rotatably into a hole provided in the outer collar. A center of a hole provided in the inner collar 13 is eccentric as compared with a center of a circumference of the inner collar 13.

An optical fibre end 14 at the side is inserted into the hole of the inner collar 13 to extend to a point where the fibre end surface 14a is in the same plane with end surface 13a of the inner collar. At this position the fibre end 14 and the inner collar 13 are fixed together by placing adhesive material 15 into an enlarged hole made at a rear end 13b of the inner eccentric collar.

The inner eccentric collar 13 can be made of transparent material such as plastic or glass so that when there is a noncomplete connection and union the light leakage from the end surface 8a of the optical fibre end 8, at the dispatching side of light, will pass through the inner collar 13 and will reach the rear end 13b of the collar. The quantity of the light leakage can then be detected by a photometer, not shown on the figure. Thus, a degree of slippage of the fibre end surface 14a of the connecting side from the fibre end surface 8a to be connected is confirmed and can be used as the standard in the adjustment operation. Desirably the adhesive material 15 should also be transparent so as to be able to detect the leakage more completely.

Holes 16 and 17 are provided radially at the thickest parts of the collars 12 and 13 respectively. Pins 18 and 19 can be inserted into these holes so that the collars 12 and 13 can be manually rotated dependently or independently of each other. The angular range of rotation of each collar will be acceptable within each 180° for right or left direction as no larger angular range is necessary. Accordingly, the fibre end 14 can be twisted 180° at the most in the right or left direction. This will be described in more detail later in conjunction with FIG. 6.

Figure 3:
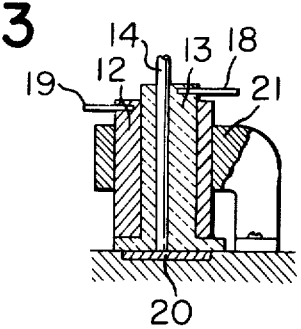
FIG. 3 is a partial sectional view showing another embodiment of the invention in which a fibre end is connected directly to a light source or a light receiver.

In the embodiment shown in FIG. 3 a side 20 to be connected is a light source element such as a semiconductor laser or a light receiver such as a photodiode. In the case of contacting the optical fibre end 14 to this element the optical fibre end 14 is adjusted to be perpendicular to the surface of the element. The outer collar 12 is rotatably suspended within a bracket 21.

Figure 4:
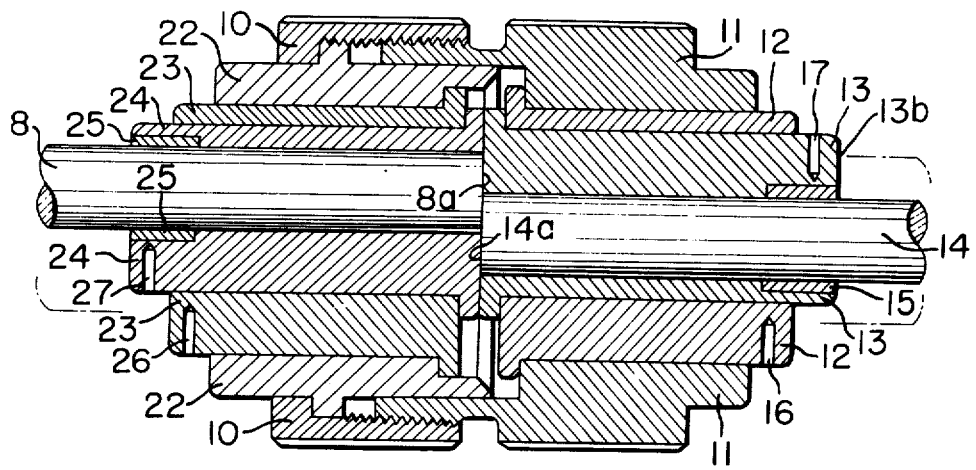
FIG. 4 is a sectional view showing a third embodiment of the connector.

FIG. 4 shows a third embodiment in which the slight adjustment arrangement of the present invention is provided at both fibre ends 8 and 14 of a connecting side and a side to be connected. Thus both sides can be displaced respectively, and a large range of adjustment is provided. This is helpful where there has been errors in manufacturing of the connector or there are particular problems at the installing position.

As seen in FIG. 4 the connector has a union swivel end 22 with a pair of outer and inner eccentric collars 23 and 24 inserted between the union swivel end 22 and the optical fibre end 8. An adhesive material 25 is placed in an enlarged hole provided at a rear end of the inner eccentric collar 24. Numerals 26 and 27 identify holes wherein pins (not shown) for rotative operation are inserted and which are bored at the thickest part of each of the inner and outer collars.

Figure 5:
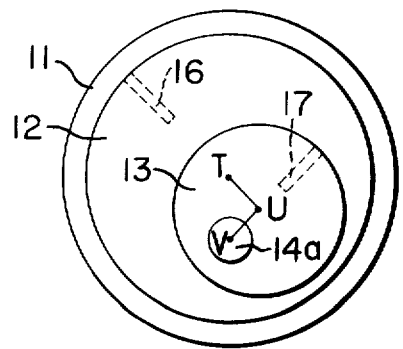
FIG. 5 is a explanatory side view of a connector, as seen from the side and showing the relationship of elements of the connector with respect to a center axis of the fibre end.

FIG. 5 shows how it is possible to easily achieve a union at the connector in case the center of fibre end surface of the side to be connected is at the center of the connector or very near to it. It is possible to align center V of the fibre end surface 14a with a center of the connector, that is to say, an outer circle center T of the outer eccentric collar 12 and it is possible to displace it's position through the outer circle center T.

Figure 6:
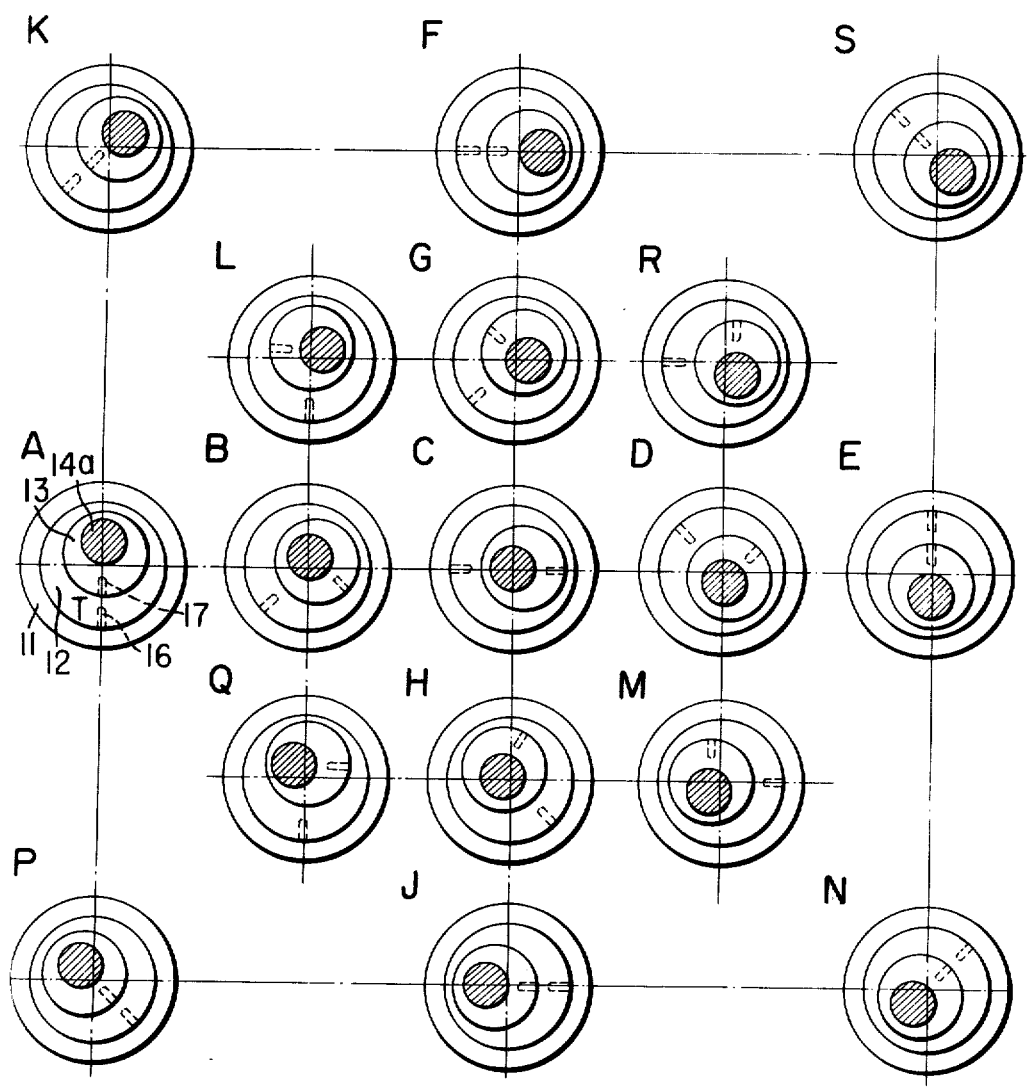
FIG. 6 is an explanatory drawing illustrating the various positions of the inner and outer collar in the connection according to the invention.

It will be understood however that, say due to manufacturing error, it may be impossible to adjust to this center T. Also, when the connector is manufactured so that the distance between the outer circle center U and the inner circle center V of the inner eccentric collar 13 is the same as the distance between the inner circle center U and the outer circle center T of the outer eccentric collar 12 it is possible with the arrangement of the double eccentric collars to extend the range of adjustment to as shown in FIG. 6. As shown across the line having positions A, B, C, D and E the fibre end surface 14a can be displaced with a straight reciprocation upwards and downwards in the figure, along a center line passing through the center T, by displacing the holes 16 and 17 in counter directions as well as at the same angular velocity. As shown across the line having positions F, G, C, H and J it can also be displaced with a straight reciprocation towards the right and left direction in the figure along a center line passing through the center T.

Further, as shown by K, L, C, M and N or P, Q, C, R and S, it can also be displaced with a straight reciprocating in a diagonal direction in the figure along a center line passing through the center T. Accordingly, as it became clear from above, all adjustments can be achieved for any radial direction of 360° passing through the center T.

On the other hand, an adjustment along the outer most circumference, as shown by A, K, F, S, E, N, J and P can be achieved by a circular displacement of both holes 16 and 17 and keeping them in alignment. The adjustment at an intermediate position, as shown by example B, Q, H, M, D, R, G and L is achieved by rotating operation of both holes keeping a certain angular shift between them and as a consequence of the particular arrangement of the inner and outer collars.

The connector according to the present invention enables one to perform adjustment in the range that is impossible to reach with a single eccentric collar. Further it is possible to perform a slight adjustment for a union especially at the center and a near point to it by means of equalizing the distance between the outer circle center U and the inner circle center V of the inner eccentric collar 13 and a distance between the outer circle center T and the inner circle center U of the outer eccentric collar 12.

Furthermore, as shown in FIG. 4, the fibre ends can be aligned by a slight adjustment at the circumferential part by providing double eccentric collars 12, 13 and 23, 24.

Furthermore, by making the eccentric inner collar of the connecting side of transparent material, it is possible to detect the light leakage during disunion at the end surface 13b of the eccentric inner collar. This permits the adjustment procedure to continue to a successful conclusion by monitoring the light leakage, during the procedure.

I claim:

1. An optical fibre end connector comprising:
   a. A first connector portion receiving a first optical fibre end to which another optical fibre end is to be connected, the first optical fibre end being in said portion so that its end surface lies in a plane of a surface wall of said first connector portion;
   b. A second connector portion having an inner collar; means defining a hole extending longitudinally through said collar and being eccentrically displaced with respect to the longitudinal axis of said inner collar, an outer collar, means defining a hole extending longitudinally through said outer collar and being displaced eccentrically with respect to the longitudinal axis thereof, said inner collar being rotatably received within the hole in said outer collar, the distance between the center line of the hole in said outer collar and the center line of the hole in said inner collar being equal to the distance between the longitudinal axis of said outer collar and the longitudinal axis of said inner collar, means for rotating said inner and outer collars with respect to each other, the another fibre end being fixedly positioned within the hole in said inner collar and with the end surface of the another optical fibre end lying in a plane of a surface wall of said inner collar;
   c. Support means rotatably receiving said outer collar and being adjustably positioned on said first connector portion, said support means being adjustable to move said surface wall of said inner collar into flush and abutting relationship with said surface wall of said first connector portion, whereby said inner and outer collars can be rotated with respect to each other to align another optical fibre end with the first optical fibre end.

2. A connector as defined in claim 1 wherein said inner collar is of transparent material.

3. A connector as defined in claim 1 wherein the first optical fibre end is fixedly received in another inner collar, means defining a longitudinally extending hole which is eccentrically located with respect to the longitudinal axis of said another inner collar, said first optical fibre end being received in said hole and terminating at said surface wall of said first connector portion, another outer collar rotatably disposed between said another inner collar and said support means, means defining a hole extending longitudinally of said another outer collar and in which said another inner collar is received, said hole being eccentrically displaced with respect to the longitudinal axis of said another outer collar, and other means on said another inner and outer collars whereby said another collars can be rotated with respect to each other.

4. In combination an optical fibre end connector, receiving a fibre end, and an associated light source element which is supported on a base means to present a surface wall above the base, the connector comprising:
   a. An inner collar, means defining a hole extending longitudinally through said collar and being eccentrically displaced with respect to the longitudinal axis of said inner collar, a outer collar, means defining a hole extending longitudinally through said outer collar and being displaced eccentrically with respect to the longitudinal axis thereof, said inner collar being rotatably received within the hole in said outer collar, the distance between the center line of the hole in said outer collar and the center line of the hole in said inner collar being equal to the distance between the longitudinal axis of said outer collar and the longitudinal axis of said inner collar, means for rotating said inner and outer collars with respect to each other, the fibre end being fixedly positioned within the hole in said inner collar and with the end surface of the optical fibre end lying in a plane of a surface wall of said inner collar;
   b. Support means rotatably receiving said outer collar and being positioned on said base means adjacent said light source element to position said surface wall of said inner collar into flush and abutting relationship with said surface wall of said light source element, whereby said inner and outer collars can be rotated with respect to each other to align the optical fibre end to be perpendicular to the surface of said light source element.

* * * * *